July 12, 1938.   F. M. CLARK ET AL   2,123,713
PROTECTIVE MEANS FOR ELECTROLYTIC DEVICES
Filed Oct. 2, 1935
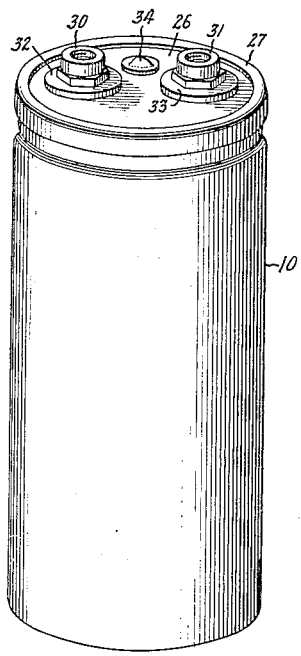
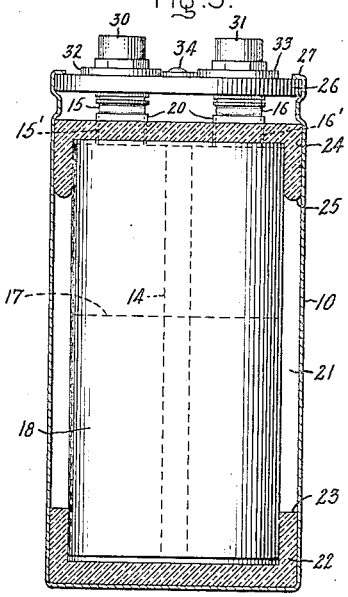
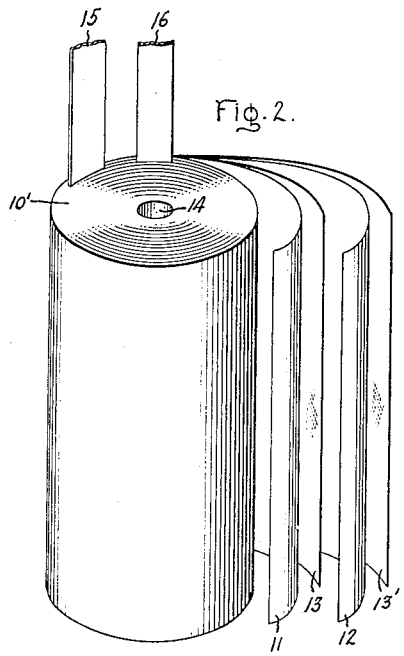
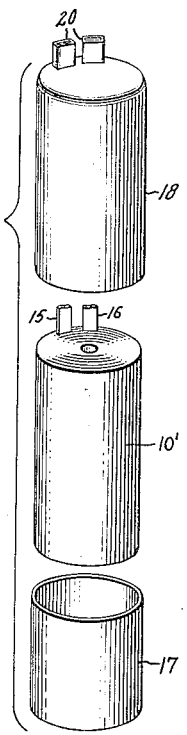
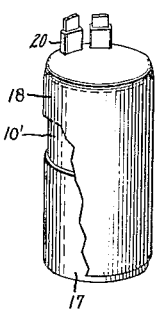
Inventors:
Frank M. Clark,
Ralph A. Ruscetta,
by Harry E. Dunham
Their Attorney.

Patented July 12, 1938

2,123,713

UNITED STATES PATENT OFFICE 2,123,713

PROTECTIVE MEANS FOR ELECTROLYTIC DEVICES

Frank M. Clark and Ralph A. Ruscetta, Pittsfield, Mass., assignors to General Electric Company, a corporation of New York Application October 2, 1935, Serial No. 43,224

6 Claims. (Cl. 175—315)

The present invention relates to electrolytic devices particularly of the so-called "dry" type, and has for a general object improvements in the construction of such devices whereby they may be manufactured with greater facility and dependability and whereby they may be made to retain their stability, operative efficiency and original desirable characteristics during extended periods of service.

For reasons of economy, it has been common practice in the manufacture of electrolytic devices, such as capacitors and the like, to employ metallic casings or containers. In the case of wet electrolytic devices, the casing usually serves as one electrode, that is, the cathode. However, in the case of dry electrolytic devices it is usual to employ two metallic electrodes, at least one of which is filmed, and to omit the casing from the electrical circuit. In dry electrolytic devices, the casings therefore constitute hazards since they promote trouble resulting from low insulation to ground. It has been the practice heretofore to insulate the active elements of dry electrolytic devices from the casings by means of asphaltic material. Such material is satisfactory as long as large size casings are used so that sufficient space is provided for the asphaltic material between the casings and the active elements. However, commercial demands have made the use of smaller and smaller casings necessary. The obtaining of a satisfactory assembly using asphaltic material becomes increasingly difficult as the size of the enclosing casing is reduced to approach the size of the active unit, and a point is reached in this reduction of casing size at which the space between the unit and the casing is so restricted that it is impossible to insure the complete enclosure of the active elements by means of the asphaltic material. The reason for this is that asphaltic material has to be heated to extremely high temperatures in order to lower the viscosity sufficiently to allow penetration of the melted material into the small space between the casing and the elements of the electrolytic device. Such high temperatures overheat the electrolytic compound and result in undesirable decomposition thereof. Moreover, it is highly desirable in the construction of dry electrolytic devices, particularly capacitors, to incorporate a definite space to allow for thermal expansion of the electrolyte without thereby permitting the possibility of excess "bleeding" of the electrolyte from the active unit of the device during service use, which "bleeding" is undesirable in that it is conducive to high electrical leakage to the metallic casing and endangers as well the serviceability of the active unit.

In order to overcome these difficulties in the manufacture of dry electrolytic devices, it has been proposed to wrap the active elements of the devices, which comprise the electrodes and the electrolyte, in paper impregnated with either asphalt or varnish. However, if varnish is used, the electrolyte may attack the same, and, irrespective of whether the paper be impregnated with asphalt or varnish, the electrolyte tends to migrate along the laminations of the treated paper used. Eventually therefore a low resistance path to the metallic casing and thence to ground is obtained. This reduces the efficiency of the electrolytic device and may lead to dielectric failure.

A specific object of the present invention is, therefore, the provision, in dry electrolytic devices, of improved insulating and sealing means whereby the electrolyte employed is protected during manufacture of the device from damage and contamination and whereby leakage of the electrolyte is prevented so that the device does not deteriorate in service or become susceptible to dielectric failure or grounding.

A further object of the invention is the provision of an improved sealing and insulating means having the advantageous characteristics outlined in the preceding paragraph and which at the same time insures against damage of the electrolytic device by excessive pressures due to generation of gases in the operation of the device.

Our invention is particularly applicable in, and is described herein in connection with, the construction of electrolytic capacitors of the so-called "dry" type. Certain aspects of the invention are, however, of broader application in that they may be utilized with pronounced advantages in the construction of other forms of electrolytic devices such as lightning arresters, rectifiers and the like.

It may be stated generally that in the practice of our invention we attain the previously set forth objectives and advantages by sheathing or enclosing the active electrolytic unit, comprising the electrode elements and the interposed electrolytic compound, in a protective covering of insulating material which, preferably, is elastic, and which is impervious and chemically resistant to the electrolytic compound. A detailed understanding of the manner in which the invention is carried out may be had from the following description taken in conjunction with the accompanying drawing in which Fig. 1 shows in perspective an electrolytic capacitor of the rolled type;

Fig. 2 illustrates the manner of assembling the capacitor roll;

Fig. 3 shows the capacitor, with the casing cut away to make clear the assembly of the various elements in the completed device;

Fig. 4 is an exploded view illustrating an embodiment of the present invention, and Fig. 5 shows the elements of Fig. 4 in assembled relation.

The rolled capacitor illustrated is of the type described in detail in the copending application of Clark and Koenig, Serial No. 4665, filed Feb. 2, 1935, and assigned to the assignee of the present invention. However, it will be understood from the ensuing description that our present invention is not limited to the exemplary embodiment illustrated and that it has utility also in connection with other forms of capacitor construction both of the rolled type and of the stack type.

Referring particularly to Figs. 1 and 2 of the drawing, the capacitor illustrated has a casing 10, preferably of aluminum, and a capacitor unit 10' of the rolled type including armatures or electrodes 11 and 12 of suitable metal as, for example, aluminum, tantalum, magnesium or the like. In the rolled type of capacitor these electrodes ordinarily consist of aluminum foil having a thickness of about 1 to 3 mils. Between them is interposed a porous spacer 13 of imbibitory material such, for example, as cheesecloth or porous paper, which is impregnated or filled with the desired electrolytic compound during the fabrication of the capacitor as will be outlined hereinafter. In the drawing, two spacers 13 and 13' have been shown, since it is desired that a spacer be present in all cases between adjacent turns of the wound up strip electrodes.

Before the capacitor roll 10' is assembled, it is preferable that a film of oxide be produced on the foil electrodes, preferably by electrolytic treatment in accordance with well known practice. As outlined in the previously referred to copending application, the foil may be oxidized at about 160 volts in an aqueous solution of borax and boric acid. While it is necessary in capacitors intended for alternating current use to have both armatures filmed or oxidized, it is sufficient when the capacitors are intended for direct current use to have but one foil or armature (the anode) provided with an oxide film. In this latter case the other electrode (or cathode) need not be oxidized and in fact may consist of any metal inert with respect to the electrolyte.

After the electrodes are filmed or oxidized, they are then assembled, as by rolling, with the oxidized foils and the spacers interleaved in proper relation as illustrated in Fig. 2. For reasons to be set forth more fully hereinafter, it is preferable that the roll 10' be wound with a hollow core 14 as illustrated. Numerals 15 and 16 designate terminals which may be of any suitable type brought out from or secured to the respective foils in a manner well known in the art for the making of electrical connections thereto.

Treatment of the wound capacitor unit then takes place in accordance with well known practice in which the roll 10' is immersed for a suitable period of time and under suitable conditions of pressure and temperature, in the desired electrolytic compound which, for example, may consist of ammonium borate and ammonium acetate. At the end of the treating process the capacitor roll is cooled to a temperature preferably below 70° C. It will be found that the cloth or paper spacers are impregnated with the electrolyte which at room temperature becomes a semi-fluid or plastic mass.

Following the treating process, the capacitor is "cured" by means of an intermittently applied alternating current or direct current voltage applied with reverse polarity at stated intervals, preferably of the order of less than one minute. If desired, both alternating current and direct current curing treatments may be given.

After the curing treatment, the capacitor unit 10' is removed from the electrolyte and is then ready for mounting and sealing in the casing 10 in accordance with the present invention which will now be described in detail. First, the capacitor roll is scraped free of any excess electrolyte adhering thereto, care being taken to remove not only the electrolyte adhering to the outer surface of the roll but also any electrolyte which may be in the hollow core 14.

The cleaned capacitor roll is then encased in one or more sacks or jackets of insulating material which, in the embodiment illustrated, are of tubular form with one end closed. In addition to the property of being electrically insulating, the material employed in the construction of the jackets should be also impervious and chemically resistant to the electrolytic compound employed in the capacitor, and, for reasons hereinafter pointed out, preferably should be elastic. As examples of suitable materials which retain these desired properties during long periods may be listed natural rubber; artificial rubber compounds such as plasticised polymerized vinyl chloride and the plastic polymer of chloroprene; and modified alkyd resin compounds such as those described in U. S. Letters Patent Nos. 1,897,260 to R. H. Kienle et al. and 1,975,750 to M. M. Safford, which are assigned to the assignee of the present invention.

Fig. 4 shows an exploded view of an embodiment of our invention wherein two rubber jackets are employed, they being assembled as shown in Fig. 5. In this case, one of the jackets, designated as 17 on the drawing, is slipped over the bottom of the capacitor roll 10', and the other, designated 18, is slipped over the top of the roll. Both jackets are preformed to proper size and shape so that they fit snugly over the capacitor roll. It is preferable that the bottom jacket be long enough to extend upwardly over a substantial portion of the sides of the capacitor roll and that the top jacket be long enough to overlap the bottom jacket and extend substantially to the bottom of the roll, this arrangement being shown in Figs. 3 and 5. Both of the jackets are previously tested to insure their non-porosity so that they are impervious to the electrolyte employed in the capacitor roll. It is further preferred that, although the jackets fit snugly about the capacitor roll, they should, however, not be subjected to any great degree of mechanical tension. The end of the top jacket 18 may be simply pierced in order to allow passage of the terminals 15 and 16, but is illustrated as being provided with formed holes or collars 20 which are adapted to fit snugly along the greater portion of the length of the terminals to thereby eliminate danger of short circuits due to contact between any elements of the capacitor assembly.

It will be evident that the described arrangement of the jackets or sacks provides a snug-fitting non-porous sheath or envelope completely enclosing the capacitor roll, providing care is exercised in forming the terminal vent slits or collars 20 in the end of the top jacket. In view of the fact that the jackets are made of rubber or the equivalent, they retain their elasticity for long periods of time and are not adversely affected by the usual electrolytic compounds employed. The jackets aid in the manufacture of the capacitor in that the sheathing provided thereby facilitates handling of the capacitor roll and prevents contamination of the electrolyte from external sources, and also serves efficiently as a sealing means to confine the electrolyte within the capacitor roll.

The jacketed capacitor roll is placed in the metallic casing 10 which is in the form of a cylindrical can, the inside diameter of which is somewhat larger than the outside diameter of the roll in order that space 21 be provided between the roll and the casing. A small body 22 of sealing compound is placed in the bottom of the can to anchor the capacitor roll therein. We prefer that the sealing compound be an asphalt pitch with a flow point not higher than 100° C., but in any case it is essential that the melting point of the compound be carefully controlled so that the temperature necessary to maintain it in fluid condition during the assembly of the roll in the can is not higher than 115 to 120° C. This is necessary in order to prevent decomposition of the ammonium borate or other electrolytic compound employed. The sealing compound is made to come only a short distance up the side of the can as indicated at 23, this being sufficient to securely anchor the capacitor roll in the can.

The top of the capacitor is then sealed in with a body 24 of suitable compound which may be asphalt pitch but which preferably is stearine pitch, this latter material being of a rubbery nature at room temperature to insure flexibility of the top seal for reasons hereinafter to be pointed out. The top seal is not allowed to fill completely the space between the capacitor roll and the can and is illustrated in Fig. 3 as extending only a short distance down the side of the can to a point designated 25. Terminals 15 and 16, which are of flexible aluminum or like foil, extend with their surrounding collars 20 upwardly through the top seal as shown at 15' and 16'. The center space or hollow core 14 is kept clear and free from sealing compound. It will be evident that the rubber jackets 17 and 18 not only insure against contamination of the electrolyte by the asphalt and other external means but also protect the capacitor roll from the overheating effects of the hot asphalt during sealing, and it will be evident, also, that the natural tendency of the jackets to fit snugly about the capacitor roll due to their elasticity is aided by the lapping of the sealing compound over the ends of the encased roll.

As a final step, which is preferred though not absolutely necessary, the open end of the can is closed by means of a disc 26 of heavy cardboard, hardened insulation material or other suitable material, care being exercised to leave a space between the disc and the top sealing compound. The rim of the can is then crimped over the disc to hold it in place as illustrated at 27, the terminals 15 and 16 previously having been connected to the external contacts 30 and 31 having suitable insulating bushings 32 and 33. A breathing vent 34 may be provided if desired.

By the assembly just described, two expansion chambers are provided to protect the capacitor roll from damage due to the evolution of gases during operation of the capacitor. One of these chambers is provided by the center core 14 which is protected from the sealing compound by means of the flexible diaphragm provided by the end of the top rubber jacket 18, and expansion of gases is allowed to take place therein by reason of the flexibility of the jacket and of the top sealing body 24. The second expansion chamber is provided by the space 21 at the sides of the capacitor roll since the flexibility of the rubber sheath provided by the jackets allows for expansion into this space.

It will be evident from the foregoing description that pronounced advantages are secured in the construction of capacitors and the like in accordance with our present invention. Certain of these advantages may be briefly outlined as follows: (1) Elimination of contamination and damage to the electrolyte during construction of the capacitor, (2) insurance against leakage of electrolyte and grounding of the capacitor roll on the metallic casing and (3) prevention of damage to the capacitor roll by gases thrown off during operation of the capacitor. The use of asphaltic or like materials for sealing the electrolyte within the capacitor roll is rendered unnecessary and hence the difficulty of manufacture of the capacitor is greatly reduced for reasons previously set forth. The jackets or sacks constitute a highly efficient means of insulating the capacitor from the grounded metallic case and effectively prevent the escape of electrolyte from the capacitor roll so that there is secured during long periods of service great stability in the values of resistance to ground. And furthermore these pronounced advantages are secured irrespective of the type of service to which the devices are put and regardless of whether they are disposed in upright, inverted or horizontal positions.

It will be evident from the foregoing discussion that our invention is not limited by the details set forth and that various modifications may be made therein without departing from the spirit and scope of the invention as defined in the appended claims.

What we claim as new and desire to secure by Letters Patent of the United States, is:

1. In a capacitor assembly, the combination with a capacitor unit of the dry electrolytic type having metallic foil electrodes assembled into a compact body with plastic electrolytic compound interposed between the electrodes and having connection terminals extending outwardly from one end of the body, of a pair of preformed nonporous tubular jackets of elastic rubber each drawn onto said body from an opposite end of the body with one of said jackets overlapping the other of said jackets, each of said jackets having an integrally formed closed end for covering a respective one of the opposite ends of said body and both of said jackets being of such size as to fit tightly about said body in order normally to seal said plastic electrolytic compound between said electrodes while providing for expansion of gases generated within said body, and means providing openings in the closed end of one of said jackets for the outward projection of said terminals.

2. In a capacitor assembly, the combination with a dry electrolytic capacitor roll having metallic foil electrodes assembled with semi-fluid electrolytic compound interposed between the electrodes, said roll being formed with a hollow core extending therethrough from end to end, of a first non-porous sack of elastic insulating material tightly fitting over one end of said roll to prevent escape of said compound from between said electrodes at said one end of the roll and providing a flexible diaphragm over one end of said hollow core, and a second non-porous sack of elastic insulating material tightly fitting over the other end of said roll to prevent escape of said compound from between said electrodes at said other end of the roll and providing a flexible diaphragm over the other end of said hollow core, said sacks cooperating with said hollow core for providing an expansion chamber to prevent damage to the capacitor unit by gases given off in the operation thereof.

3. In an electrolytic device, the combination with an active electrolytic unit of the dry type including metal foils assembled with semi-fluid compound interposed therebetween, of means providing a non-porous envelope of elastic electrical insulating material tightly enclosing said unit to prevent escape of said compound from between said electrodes, a tubular metallic casing surrounding the enclosed unit, said casing being of larger cross sectional area than said unit to provide a space between the sides of the unit and the casing, and sealing means disposed adjacent the ends of said unit for anchoring the unit in said casing and for sealing off the opposite ends of said space with a substantial portion of said space between the end sealing means being unobstructed to provide for the expansion of said elastic envelope thereinto under the force of gases given off in the operation of the electrolytic unit.

4. In a capacitor assembly, a dry electrolytic capacitor unit of the rolled type having a hollow axial core and provided with electrical terminal connections extending outwardly from one end thereof, means providing a non-porous elastic rubber envelope snugly enclosing the capacitor roll with restricted openings for the outward projection of said terminals, a tubular metallic casing surrounding the enclosed roll and having an open end and a closed end, said casing having greater cross sectional area than said roll to provide a space between the sides of the roll and the wall of the casing, a body of hardened insulating material disposed adjacent the closed end of said casing for anchoring said roll therein, and a body of flexible hardened insulating material sealing the open end of said casing with said terminals extending therethrough.

5. In a capacitor, an active capacity unit of the dry electrolytic type comprising paired electrode foils assembled into a compact body with plastic electrolytic compound interposed between the foils, a sheathing of elastic material enclosing said body and substantially conforming to the shape thereof and fitting tightly against the surfaces of the body to seal said compound within the body, the material of said sheathing being impervious and chemically resistant to the electrolytic compound, an enclosing casing for the sheathed body and means for anchoring the body within the casing, which said casing is relatively larger than said sheathed body in order to afford between the casing and the exterior of the body a space providing for the expansion of said elastic sheathing in case of accumulation of gases within the body.

6. In a capacitor, an active capacity unit of the dry electrolytic roll type including metallic foil electrodes rolled with plastic electrolytic compound interposed therebetween, and a protective covering for said unit including a pair of non-porous sacks of elastic insulating material respectively disposed over opposite ends of the unit, said sacks being preformed to such size and shape as to provide tight-fitting continuous sheathings for the surfaces of the opposite ends of said unit and portions of the sides of the unit thereby effectively to seal said compound within the unit while providing for thermal expansion of the compound and of gases generated within the unit.

FRANK M. CLARK.
RALPH A. RUSCETTA.